US012248306B2

(12) United States Patent
Schlemelch et al.

(10) Patent No.: US 12,248,306 B2
(45) Date of Patent: Mar. 11, 2025

(54) ABSTRACTION OF PLC COMMUNICATION

(71) Applicant: Siemens Aktiengesellschaft, Munich (DE)

(72) Inventors: Manuel Schlemelch, Erlangen (DE); Florian Ersch, Plainsboro, NJ (US); Hartmut Ludwig, West Windsor, NJ (US)

(*) Notice: Subject to any disclaimer, the term of this patent is extended or adjusted under 35 U.S.C. 154(b) by 311 days.

(21) Appl. No.: 17/635,154

(22) PCT Filed: Aug. 28, 2020

(86) PCT No.: PCT/US2020/048353
§ 371 (c)(1),
(2) Date: Feb. 14, 2022

(87) PCT Pub. No.: WO2021/041774
PCT Pub. Date: Mar. 4, 2021

(65) Prior Publication Data
US 2022/0291668 A1 Sep. 15, 2022

Related U.S. Application Data

(60) Provisional application No. 62/893,425, filed on Aug. 29, 2019.

(51) Int. Cl.
*H04B 5/45* (2024.01)
*G05B 19/05* (2006.01)
*G05B 19/418* (2006.01)

(52) U.S. Cl.
CPC ....... *G05B 19/4185* (2013.01); *G05B 19/052* (2013.01)

(58) Field of Classification Search
CPC .......................... G05B 19/4185; G05B 19/052
See application file for complete search history.

(56) References Cited

U.S. PATENT DOCUMENTS 7,676,281 B2 * 3/2010 Hood ................. G05B 19/4188
700/20
7,962,213 B2 * 6/2011 Arnholt ................. A61N 1/056
607/116

(Continued)

FOREIGN PATENT DOCUMENTS

CN 101765817 A 6/2010
CN 105589923 A 5/2016

(Continued)

OTHER PUBLICATIONS

International Search Report corresponding to PCT application No. PCT/US2020/048353; 8 pages.

*Primary Examiner* — Hai V Nguyen

(57) ABSTRACT

Current approaches to integrating industrial ecosystems, for instance integrating automation functions across different vendors of programmable logic controllers (PLCs), lack efficiencies and capabilities. In an example aspect, a consumer, for instance a PLC, can poll PLCs for an automation function. In response to the polling, a first PLC that includes a memory defining a plurality of dedicated memory areas, can retrieve an interface from a registry memory area that stores information concerning available interfaces in a provider memory area of the plurality of dedicated memory areas, such that the consumer discovers the interface. The consumer can bind to the interface so as to establish a connection between the consumer and the first PLC at runtime of the automation function. In some cases, the plurality of dedicated memory areas further defines a consumer memory area. The first PLC can track available interfaces associated with the first PLC in the registry memory area of the plurality of dedicated memory areas.

15 Claims, 7 Drawing Sheets

(56) References Cited

U.S. PATENT DOCUMENTS

| | | | |
|---|---|---|---|
| 8,799,800 B2 * | 8/2014 | Hood | G06F 9/451 715/771 |
| 9,489,832 B2 * | 11/2016 | Nair | G05B 19/418 |
| 9,568,908 B2 * | 2/2017 | Lawson | G06F 9/5072 |
| 10,609,185 B2 * | 3/2020 | Bliss | G06F 3/0481 |
| 2006/0259106 A1 * | 11/2006 | Arnholt | A61N 1/3752 607/116 |
| 2006/0259160 A1 * | 11/2006 | Hood | G05B 19/4188 700/20 |
| 2006/0259500 A1 * | 11/2006 | Hood | G05B 19/056 |
| 2006/0259634 A1 * | 11/2006 | Hood | G05B 19/4185 709/230 |
| 2006/0288301 A1 * | 12/2006 | Hood | G06F 9/451 715/744 |
| 2008/0127065 A1 * | 5/2008 | Bryant | G05B 19/056 717/109 |
| 2012/0029656 A1 * | 2/2012 | Colombo | G05B 19/41845 700/7 |
| 2013/0212160 A1 * | 8/2013 | Lawson | G06F 16/9535 709/203 |
| 2014/0223342 A1 * | 8/2014 | Hood | G06F 3/0484 715/762 |
| 2015/0287318 A1 * | 10/2015 | Nair | G06Q 10/10 340/5.6 |
| 2017/0126841 A1 * | 5/2017 | Bliss | H04L 67/12 |
| 2017/0337226 A1 * | 11/2017 | Bliss | H04L 67/1097 |
| 2019/0182106 A1 * | 6/2019 | Gibson | H04L 67/04 |
| 2022/0292136 A1 * | 9/2022 | Hubauer | G06F 16/906 |
| 2022/0342374 A1 * | 10/2022 | Ludwig | G06F 8/35 |
| 2023/0350358 A1 * | 11/2023 | Ludwig | G05B 15/02 |

FOREIGN PATENT DOCUMENTS

| | | |
|---|---|---|
| EP | 1880253 A2 | 1/2008 |
| WO | 2010043629 A1 | 4/2010 |
| WO | WO-2019054929 A1 * | 3/2019 |

* cited by examiner

ABSTRACTION OF PLC COMMUNICATION

CROSS REFERENCE TO RELATED APPLICATIONS

This application is a national phase filing under 35 U.S.C. § 371 of International Patent Application No. PCT/US2020/048353, filed Aug. 28, 2020, which claims the benefit of priority to U.S. Provisional Patent Application Ser. No. 62/893,425, filed Aug. 29, 2019, both of which are incorporated herein by reference in their entireties.

BACKGROUND

Automation systems can be used to control the operation of machines and other components in a systematic manner. Automation systems can include various automation domains such as factory automation, process automation, building automation, energy automation, and the like. Automation systems can also include equipment from multiple vendors. In some cases, equipment and machines within an automation system may use varying mechanisms associated with their respective ecosystems, such as varying runtime environments, protocols, and programming languages (e.g., vendor-specific programming languages). By way of example, automation functions are often platform specific and/or are implemented in a proprietary manner. Thus, generating an automation function that is interoperable with other automation functions can be cumbersome and time-consuming.

In particular, automation systems often include programmable logic controllers (PLCs) from different vendors that can include various interfaces for connectivity. Such a multitude of interfaces can create interoperability difficulties. For example, a program in an automation system that is written in a high-level programming language (e.g., C, C++, C#) might not interoperate with a given PLC without a developer learning details of how the interfaces work so as to develop an application protocol on top of the program. By way of further example, enabling a given PLC to interoperate with a given program application may include writing adapters on both the PLC side and the program application (e.g., C, C++, C#) side, as well as debugging and testing the corresponding communication path. Further, the process may have to be repeated each time an interface changes.

Thus, it is recognized herein that current approaches to integrating industrial ecosystems, in particular integrating various applications with various PLCs, lack efficiencies and capabilities. For example, system integrators are often required to develop special software that functions as an adaptor between different applications and PLCs. In such cases, the adaptor is often specific to a particular set of equipment or communication channels, which can limit reusability, among other technical drawbacks.

BRIEF SUMMARY

Embodiments of the invention address and overcome one or more of the described-herein shortcomings or technical problems by providing methods, systems, and apparatuses for establishing interoperability among programmable logic controllers (PLCs).

In an example aspect, a consumer, for instance a PLC, can poll PLCs for an automation function. In response to the polling, a first PLC that includes a memory defining a plurality of dedicated memory areas, can retrieve an interface from a registry memory area that stores information concerning available interfaces in a provider memory area of the plurality of dedicated memory areas, such that the consumer discovers the interface. The registry memory area can be cyclic polled about automation functions that the associated PLC provides. When the PLC provides a given interface (automation function), information concerning the provided interface can be stored in the memory registry area. The consumer can bind to the interface so as to establish a connection between the consumer and the first PLC at runtime of the automation function. In some cases, the plurality of dedicated memory areas defines the provider memory area, the registry memory area, and a consumer memory area. For example, if a given PLC consumes interfaces the PLC can include the consumer memory area. define a consumer memory area and a registry memory area. The first PLC can track available interfaces associated with the first PLC in the registry memory area of the plurality of dedicated memory areas. Thus, another client can poll the data in the registry memory area to discover location information associated with the provider and consumer memory areas. In various examples, the first PLC stores interfaces associated with the PLC operating as a provider in the provider memory area, and stores interfaces associated with the PLC operating as a consumer in the consumer memory area. After binding the consumer can send data to the first PLC via the interface, and the PLC can send data to the consumer via the interface. Further, after binding, a function call can be sent to the first PLC to execute the automation function.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, in current approaches to integrating automation systems, in particular integrating a given programmable logic controller (PLC) with a given application, a developer often needs to identify the available protocols of the PLC, select a protocol that is suitable for the application, and learn the details of the protocol or interface defined by the PLC and application. In some cases, a basic communication channel is constructed, which may involve discovering or configuring a given PLC for connection. For example, the discovered PLC may need to be investigated to determine how data can be exchanged between the application and the PLC. Further, an application protocol may need to be developed and/or adapted to the business logic implemented by the PLC. In some cases, constructing the communication channel may require adapters for the PLC and the application. With respect to adapters, the developer may need to consider marshaling and unmarshalling (e.g., converting a call to data in a specific layout). The channel and the application layer on top of the channel may then need to be then tested. Further still, when the requirements of the application changes, the developer may need to manually change the adapters. Alternatively, or additionally, if the underlying communication layer can no longer support the requirements of the application, the developer may need to start over.

Figure 1:
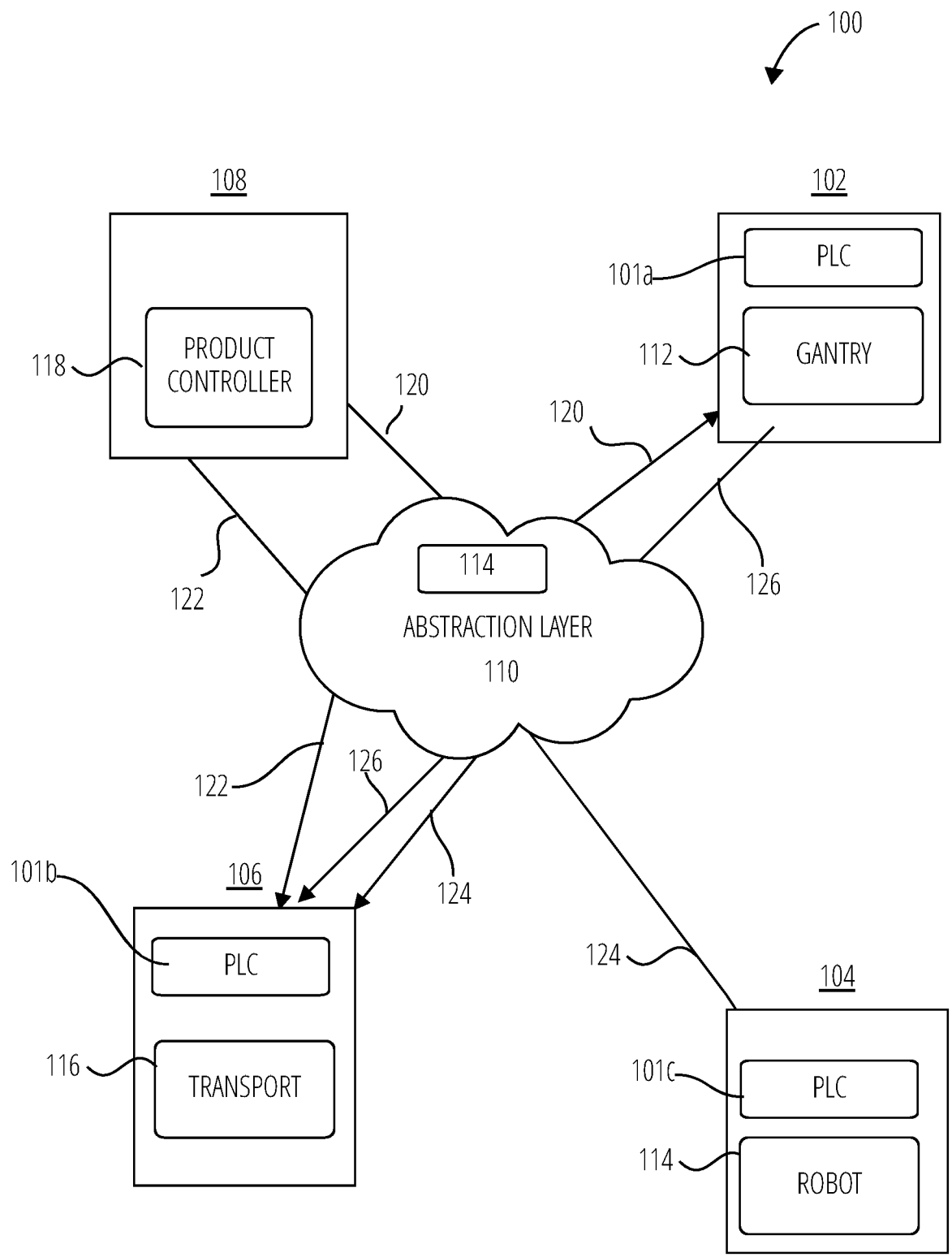
FIG. 1 is a block diagram that illustrates an example automation system and an example use case for the automation system, in accordance with an example embodiment.

Embodiments described herein address the above-described issues, among others, so as efficiently integrate various applications with various PLCs. Referring to FIG. 1, an example automation system 100 defines a plurality of ecosystems or domains. In particular, the example system 100 can include a product ecosystem 108, a production ecosystem 102, a production ecosystem 104, and a production ecosystem 106. The example industrial system 100 can define or be part of a factory, such as a factory for manufacturing or assembling various products. In accordance with the example, the production ecosystem 102 includes a gantry station 112, the production ecosystem 104 includes a robot station 114, and the production ecosystem 106 includes a transport station 116, though it will be understood that the production ecosystems can include any stations as desired. It will further be understood that while four ecosystems of the example automation system 100 are illustrated, automation systems described herein may include any number of ecosystems, and all such systems are contemplated as being within the scope of this disclosure.

Each ecosystem can include physical assets that can be controlled by automation equipment configured to control the respective physical assets. Such automation equipment can include one or more programmable logic controllers (PLCs) 101. By way of example, the gantry station can include a gantry PLC 101a, the transport station can include a transport PLC 101b, and the robot station 114 can include a robot PLC 101c. The PLCs, and thus the automation equipment, may be specific to one or more physical assets in the respective ecosystem. The automation system 100 can be configured to perform various automation functions. The automation system 100 can further define an abstraction layer 110 that abstracts (exposes) automation functions that can be performed by the automation equipment and the physical assets.

Still referring to FIG. 1, the abstraction layer 110 can abstract various functional characteristics, which can define automation functions, from the automation equipment, in particular the PLCs 101. The automation functions can be soft-wired together, such that the abstraction layer 110 can serve as an intermediary between various development environments and various automation equipment. Thus, the automation system 100, in particular the abstraction layer 110, can provide functionality corresponding to a physical component, for instance the automation equipment and/or physical assets. In doing so, developers can operate in one or more development environments, for instance a development environment of their choice, to use various automation functions, via the abstraction layer 110, and the automation functions can be performed by the automation equipment and physical assets. In particular, the abstraction layer 110 can enable automation functions from different domains to interoperate with one another. The development environments may define one or more languages or platforms, such as Java, C, Matlab, Python, Siemens Totally Integrated Automation (TIA) Portal, or the like. Thus, various development environments can utilize various automation equipment from various domains, via the abstraction layer 110.

In accordance with various embodiments, the abstraction layer 110 can include a generator module or automation code generator 114, which is further described herein. The abstraction layer 110 can execute in a runtime environment, so as to provide interfaces to the automation functions. The abstraction layer 110, and thus the generator module 114, can be implemented on a server, a cloud-based computing environment, a vendor-specific runtime platform environment, or other industrial computing system, such as a computer system 510.

Each production ecosystem 102, 104, and 106 of the industrial automation system 100 can offer or provide various production skills so as to perform various industrial tasks, such as for example pick and place, transport, assembly, or the like. The product ecosystem 108 can use or consume one or more of the production ecosystems 102, 104, and 106 to assemble or manufacture one or more products. Example products include various products produced in production plants having PLCs, such as, without limitation, vehicle parts (e.g., tires, doors, engine mounting), food and beverages (e.g., mixing ingredients, controlling robots for bottling plants), pharmaceutical products, or the like, though it will be understood that any product that requires machine operations can be produced in accordance with embodiments described herein, and all such products are contemplated as being within the scope of this disclosure.

With continuing reference to FIG. 1, in some cases, the gantry station 112, robot station 114, and transport station 116 can each be provided from different equipment vendors, which can create interoperability issues addressed herein, among other challenges. By way of example, the product ecosystem 102 can include automation equipment, for instance a product controller 118, that is associated with a product that is assembled or manufactured by the industrial automation system 100. By way of example, the product controller 118 can be PC-based, and can be programmed by a first programming language, such as C for example. The product controller 118 can perform various activities during the lifecycle of a given product. For example, during a design state, a desired state of a given product can be established within the product controller 118. The desired state may refer to the overall condition of a product or machine during or after production. The desired state may indicate various information such as, for example, absolute position information, position information relative to other physical assets, temperature limitation, stress level limitations, or the like. The desired state may be determined from inputs to the product controller 118 such as, for example and without limitation, a Bill of Process (BOP), Bill of Materials (BOM), properties of the materials, and 3D models (e.g., CAD models) or other physical models of the product.

In some cases, aspects of the product may be manually defined based on user input. In some examples, processing is partially or entirely automated. In an example embodiment, the product controller 118 includes text processing utilities for extracting relevant information from standard BOP and BOM documents. The product controller 118 can also include processing utilities for understanding physical models of the product or the manufacturing environment. In an example, after the relevant information is extracted from the inputs, the information can be used to set values for the desired state of the product managed by the product controller 118. In some embodiments, these values may be set based on a set of rules coded into the product controller 118. In other examples, the product controller 118 may include one or more machine learning models trained to generate inputs based on information similar to the extracted information.

During a production state, by way of further example, the product controller 118 can control production of its product by communicating with sensors that are configured to monitor the product. Based on information that is received from sensors, the product controller 118 can compare an actual product state to the desired state. Based on the comparison, in some cases, the product controller 118 can identify machines or functions, for instance via the abstraction layer 110, within the industrial automation system 100 to realize the desired state. For example, the product controller can invoke, via the abstraction layer 110 various automation equipment of the gantry station 112, robot station 114, or transport station 116 to achieve a particular desired state.

As a practical example, during an assembly of an automobile, in particular the installation of a door onto the automobile's body, the product ecosystem 102 can include a PC or product controller 118 that corresponds to the automobile, and thus may know or determine information related to a desired state of the automobile at various steps of the assembly process. Such information may include, for example and without limitation, the position of the car door with respect to the automobile body. As further described herein, the PC or product controller 118 of the product ecosystem 102 can communicate with the production ecosystems, via the abstraction layer 110, to complete assembly of the automobile.

The gantry station 112 can be controlled by automation equipment that is programmed in a second programing language that is different than the first programming language of the product controller 118. By way of example, the gantry PLC 101a may define one or more programmable logic controllers from Siemens (e.g., SIMATIC S7-1517) that are programmed in the second programming language (e.g., IEC61131 in a TIA Portal engineering environment). Continuing with the example, the robot station 114 can be controlled by automation equipment from Kuka, such as a Kuka robot PLC 101c that is programmed in a third programming language (e.g., Java-based) that is different than the first and second programming languages. The transport station 116 can be controlled by the transport PLC 101b, which can be from MagneMotion and provide control nodes programmed in a fourth programming language (e.g., Web or C++ based). Thus, without being bound by the specific examples, the functionality of each of the PLCs 101a-c and product controller 118 can be programmed with languages and tools supported by the equipment vendor of its respective ecosystem. Further, each of the PLCs 101a-c and the PC-based product controller 118 can each implement one or more functions that are called by one another. Thus, the various PCS 101a-c and the PC-based product controller 118 need to interact with each other, in various use cases.

By way of example, an example product assembly or production is now described with reference to FIG. 1. It will be understood that the assembly is presented as an example, and that various other processes requiring additional or alternative interactions between PLCs and PC-based systems can be performed by automation systems, and all such automation systems are contemplated as being within the scope of this disclosure. At 120, the product controller 118 can send a request for the gantry station 112 to perform a pick and place operation on parts of a given product. In particular, the request can be processed by the gantry PLC 101a. In some cases, the request at 120 can be processed by the abstraction layer 110. Additionally, at 122, the product controller 118 can request that the transport station 116 move a given product to an assembly station, such as the gantry station 112, for assembly. In particular, the product controller 118 can send a request to the transport PLC 101b via the abstraction layer 110. Similarly, the product controller 118 can request that the transport station 116 move a given product to another assembly station, such as the robot station 114, for assembly. The product controller 118 can also request that the robot station 114, in particular the robot PLC 101c, perform a desired operation. At 124, for example when the robot station 114 has completed an assembly operation, the robot station 114 can request that the transport station 116 moves the product, for instance to a storage location. In particular, the robot PLC 101c can interact with the transport PLC 101b, for instance via the abstraction layer 110. Similarly, at 126, when the gantry station 112 has completed its pick and place operations, for example, the gantry station 112, in particular the gantry PLC 101a, can request that the transport station 116, in particular the transport PLC 101c, moves the product, for instance to a storage location.

Thus, in accordance with various embodiments, and as exemplified in FIG. 1, components (e.g., PCs, PLCs, etc.) can discover and utilize interfaces of other network components. For example, PCs can discover interfaces that are provided on PLCs. PLCs can discover and use interfaces implemented on other PLCs, PCs, or in the cloud or server. PLCs can also discover and use interfaces provided by their own user program using dedicated memory areas, as described further herein. In some examples, interfaces mapped to memory areas can also be used on machines or devices that have a PC operating system and an industrial PLC. In particular, for example, a device can include a PLC side and a PC side, and the business logic of a product can be implemented on the PC side, and an automation function (e.g., PickPlace) can be implemented on the PLC side of the device.

Figure 2:
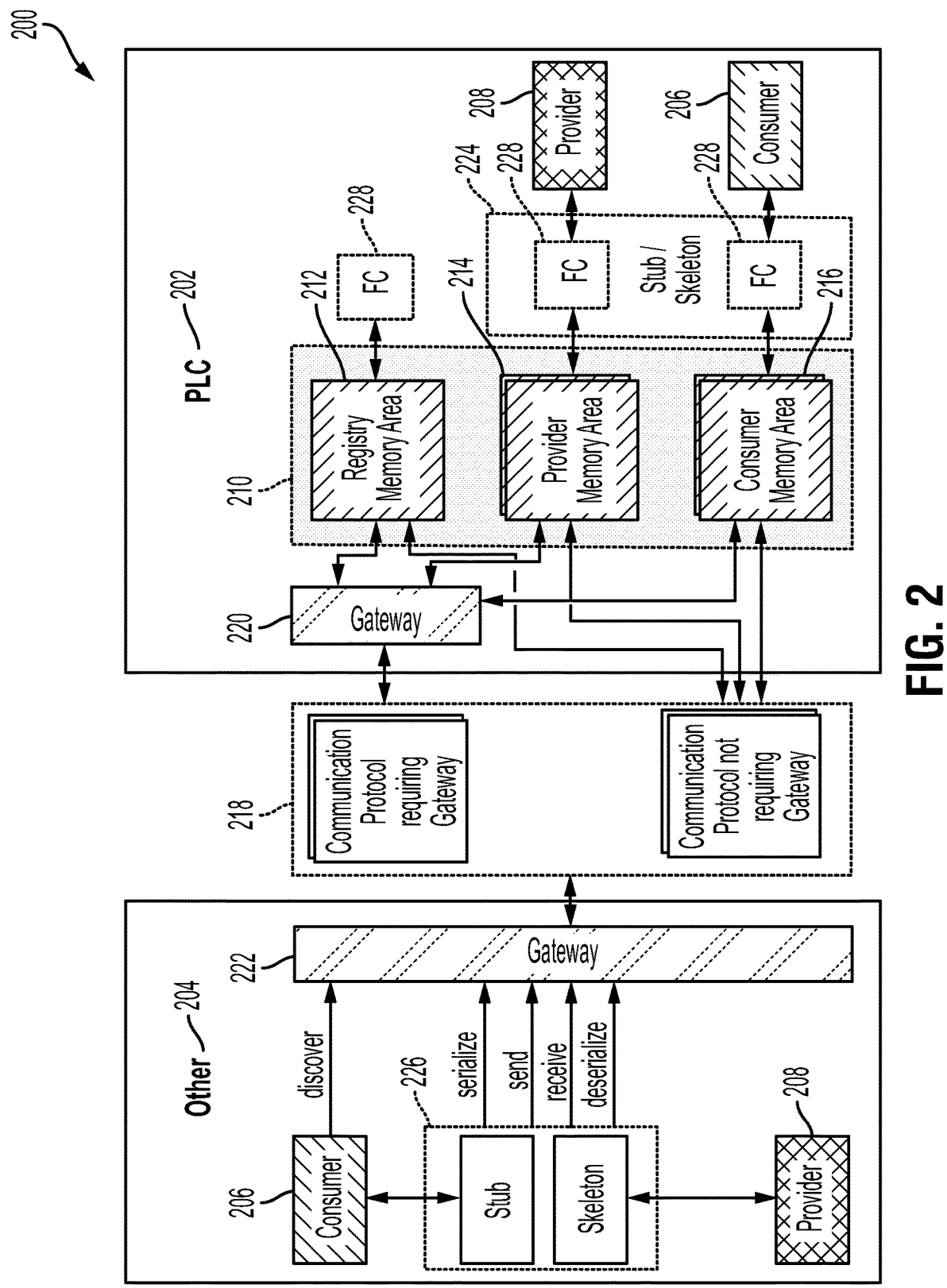
FIG. 2 is a block diagram that illustrates another example system that includes an example node and a programmable logic controller (PLC) having dedicated memory areas for assuming a provider or consumer role, in accordance with an example embodiment.

Referring also to FIG. 2, an example system 200 includes an example PLC 202 and an example node 204. The node 204 can define a device (e.g., PLC or PC) or automation function that is associated with the abstraction layer 110. By way of example, the PLCs 101a-c can define the PLC 202, and the product controller 118 can define the node 204, although it will be understood that embodiments are not limited as such. In various examples, the node 204 can perform as a consumer 206 or provider 208. Similarly, in accordance with various embodiments, the PLC 202 can perform as the consumer 206 or the provider 208. For instance, the node 204 can call an automation function provided by the PLC 202, such that the PLC 202 can perform as the provider 208, and the node 204 can perform as the consumer 206. Alternatively, or additionally, the PLC 202 can call the node 204 for a function or data, such that the PLC 202 functions as the consumer 206, and the node 204 functions as the provider 208.

In various examples, before a given interface is used, the interface is discovered by the consumer 206. For example, automation functions that are available on the PLC 202 can be accessed by their respective interface. In particular, by way of example, the PLC 202 can provide a pick and place automation function that is accessed via a PickPlace interface. The PickPlace interface can contain the operations (e.g. connect, disconnect, move, pick, place, bufferPick, bufferPlace) for performing the associated automation function (e.g., see FIG. 4). Information about this available interface and others, such as where in a provider memory area 214 the interface can be accessed, can be stored in a registry memory area 212. To discover the interface, the consumer 206 can browse the registry memory area 212 so as to find information associated with the interface. For example, the consumer 206 can browse the registry memory area 212 so as to discover a particular position or location in the provider memory area 214 of an available interface.

The PLC 202 can include a memory 210 that can define various dedicated areas, for instance the registry memory area 212, the provider memory area 214, and a consumer memory area 216. For example, the PLC 202 can track interfaces in a dedicated memory area of the memory 210, for instance the registry memory area 212. In an example PLC, the registry memory area 212 defines a global data block with a constant block number. The PLC 202 can store information concerning the interfaces that have been consumed or provided (by the PLC 202) in the registry memory area 212. For example, the PLC 202 can store location information related to the consumed and provided interfaces in the registry memory area 212. In particular, for example, the registry memory area 212 can indicate the locations of provided interfaces in the provider memory area 214. The registry memory area 212 can further indicate the locations or interfaces that have been consumed by the PLC 202, in the consumer memory area 216.

In particular, for example, the PLC 202 can include interfaces 224, and the node 204 can define interfaces 226. Each interface between nodes, for instance between the node 204 and the PLC 202, can include a stub and skeleton. Thus, a given stub and skeleton can collectively be referred to as glue code or as the interface. By way of example, the stub of the interface 226 of the node 204 can be PC-based and can include functions implemented in a dynamic link library (DLL) or a static library. Such a library can be inserted in the product ecosystem 108, for instance, in some cases, the library can be stored by the product controller 118. Similarly, the skeleton of the interface 224 of the PLC 202 can be based on a language of the PLC 202. The skeleton can be stored within the provider memory area 214, for example, as to be accessible by automation equipment within the system 200. The skeleton can be implemented in a language that is specific to the PLC 202 (e.g., function blocks). The skeleton can be stored in the global program memory of the PLC 202. The functions can then work, for instance read and write data, in the provider memory area 214.

With continuing reference to FIG. 2, the system 200 can further define a communication channel 218 between the node 204 and the PLC 202. The PLC 202 can include a gateway 220 between the memory 210 and the communication channel 218. The node 204 can also include a gateway 222 between the communication channel 218 and other modules of the node 204. The gateways 220 and 222 on both sides of the communication channel 218 can be configured to convert requests to messages that can be processed. In some cases, the messages are directly written to memory areas, for instance to the registry memory area 212, the provider memory area 214, and the consumer memory area 216. Alternatively, or additionally, messages can be passed to another gateway for processing. For example, based on the communication protocol defined by a given message, the gateway 222 can send the message to the gateway 220. Further, based on the communication protocol defined by a particular message, the gateway 222 may send the message directly to the memory areas 212, 214, or 216. Thus, various communication protocols may require the gateway because various communication protocols might not allow direct access to the memory 210 or the particular memory areas 212, 214, and 216.

In some cases, after a consumer has discovered an interface, the consumer binds to the interface. In some examples, an interface is discovered by its name (e.g., IPickPlace). The consumer can browse the registry memory area of the target PLC, in some cases, via the gateway. If the target PLC provides the interface in which the consumer is interested, information concerning the location in the provider memory area can be returned to the consumer. The consumer can then lock this specific interface, for example, by storing its identification number in the provider memory area. Such a lock can guarantees exclusive access to the interface for this single consumer. After the consumer is done using this interface, the lock can be removed and the interface can be available to use for other consumers again. In an example in which the node 204 defines the consumer 206, the consumer 206 can send a discovery message to the gateway 222, so as to discover the interface 224 and bind to the interface 224. Binding can establish a connection at runtime between the consumer 206, and the interface 224. In various examples, connections between consumers and interfaces are not specified during the compile time of the user code. For example, PLC interfaces, for instance the interface 224 of the PLC 202, can be registered and unregistered during runtime by allocating a memory area of the memory 210 and logging the interface information in the registry memory area 212. After binding is successful, the consumer 206 can serialize, deserialize, send, and receive data to the connected interface. For example, the consumer 206 defined by the node 204 can serialize, deserialize, send data to, and receive data from the interface 224, via the gateway 222. On the PLC 202, in some cases, various functional calls (FCs) 228 are used to access the memory areas 212, 214, and 216.

Figure 3:
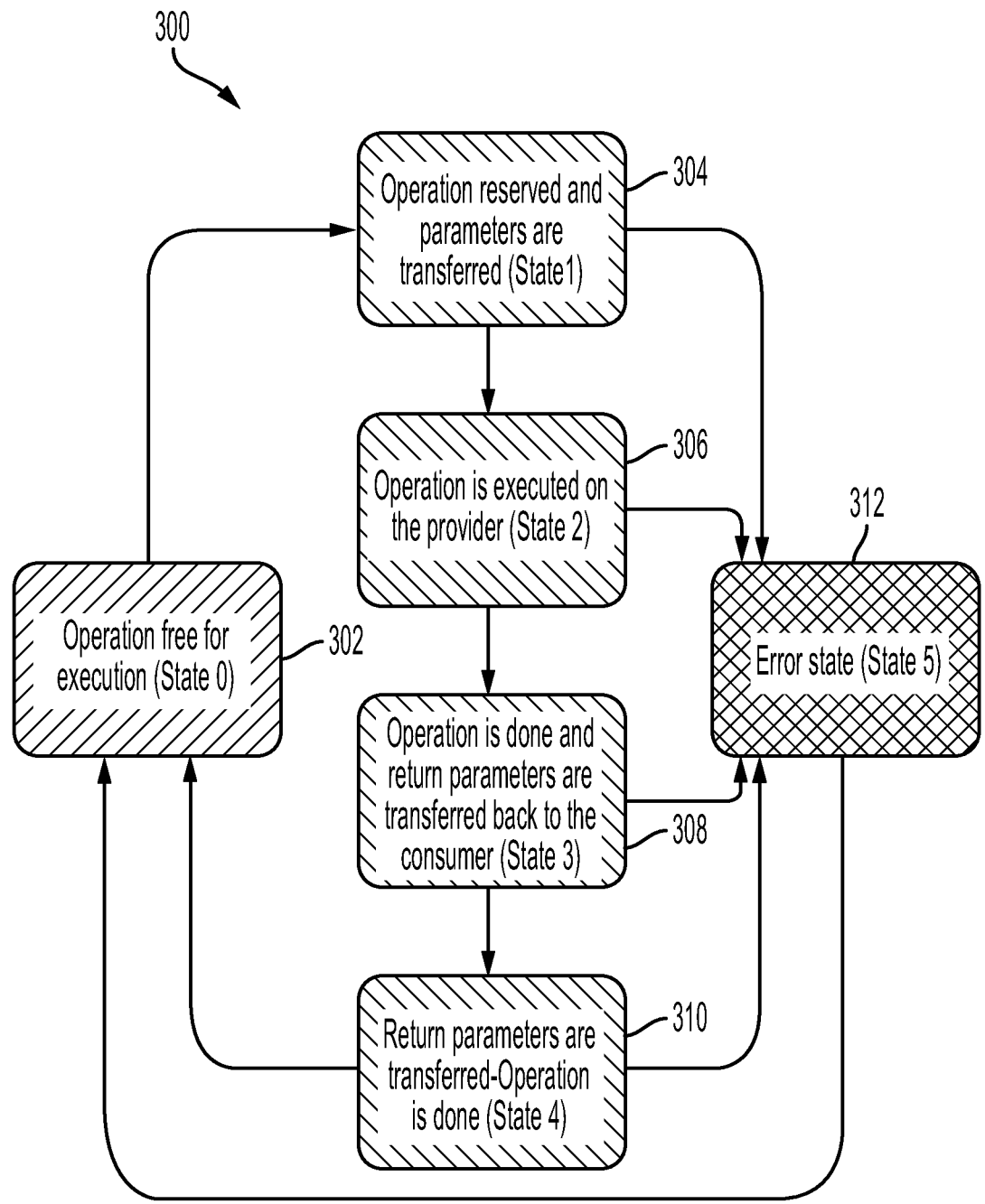
FIG. 3 is a state machine associated with an example function call (FC) to the PLC shown in FIG. 2.

Referring also to FIG. 3, an example is described that illustrates an example state machine 300 for an example function call (FC) to a PLC, for instance the PLC 204. In an example, the consumer 206 is the node 204, and the PLC 202 is the provider 208, though it will be understood that the PLC 202 can alternatively be the consumer 206. In the example, the consumer 206 has already discovered the interface 224 and is connected to the interface 224. In the example, the consumer wants to execute an operation on the PLC 202 by calling a function in the corresponding stub of the interface 224 of the PLC 202. In some cases, to map the function call to a given memory area, the state is stored in the provider memory area 214, as further described below.

With continuing reference to FIG. 3, at 302 (or state 0), the operation of the PLC 202 is free for usage. In some cases, this state is a precondition for the stub on the side of the consumer 206 to start the operation. At 304 (or state 1), the stub on the consumer side (e.g., interface 226) can control the operation of the PLC 202, for instance, by changing an operation status flag value to 1 so as to indicates that this operation is now reserved for the requesting consumer (e.g., node 204) of the operation. The PLC can also indicate, for instance via the operation status flag, that the stub is transferring the operation parameters to the provider memory area 214. At 306 (or state 2), when the transfer is done, the skeleton FCs of 224 can read the corresponding data areas in the provider memory area 214, and execute the automation function on the PLC. Further, the stub can change the value of the operation status flag (e.g., to 2) so as to signal to the skeleton that the parameters are transferred. Such a signal can further indicate to the skeleton that the skeleton can unmarshall (deserialize) the parameters. It now calls the operation on the actual provider object. In particular, the PLC 202 can call the object for the operation, for instance a pick and place operation. At 308 (or state 3), after the operation is executed on the provider object, the skeleton can marshal (serialize) the return parameters in this state so as to indicate that the return parameters are transferred back to the stub over the network, in particular, for example, over the communication channel 218. At 310 (or state 4), the stub can return the call to the consumer (e.g., the node 204) so as to indicate the end of the operation. In some cases, this return occurs when the all the return parameters are received by the stub. In some examples, at 312 (or state 5), an error status flag is set if any error occurs during the execution of the operation, or if anything fails during the parameter transfer. In this case, the stub can return the unsuccessful call of the consumer and exits the operation.

The state of each operation illustrated in FIG. 3 can be managed by an edge controller, for instance the gateways 220 and 222. In an example, data exchange with the PLC 202 is based on cyclic polling from the gateway 222. Each interface associated with the PLC 202, which can include a stub and skeleton, can define a dedicated memory area on the PLC 202 for keeping track of the states for each operation, and for the transferring operation parameters. By way of example, a SIMATIC PLC can have a Template Data Block as its dedicated memory area, which is described in SCL (SIMATIC Structured Language). Such a block can be generated by the generator module 114.

Figure 4:
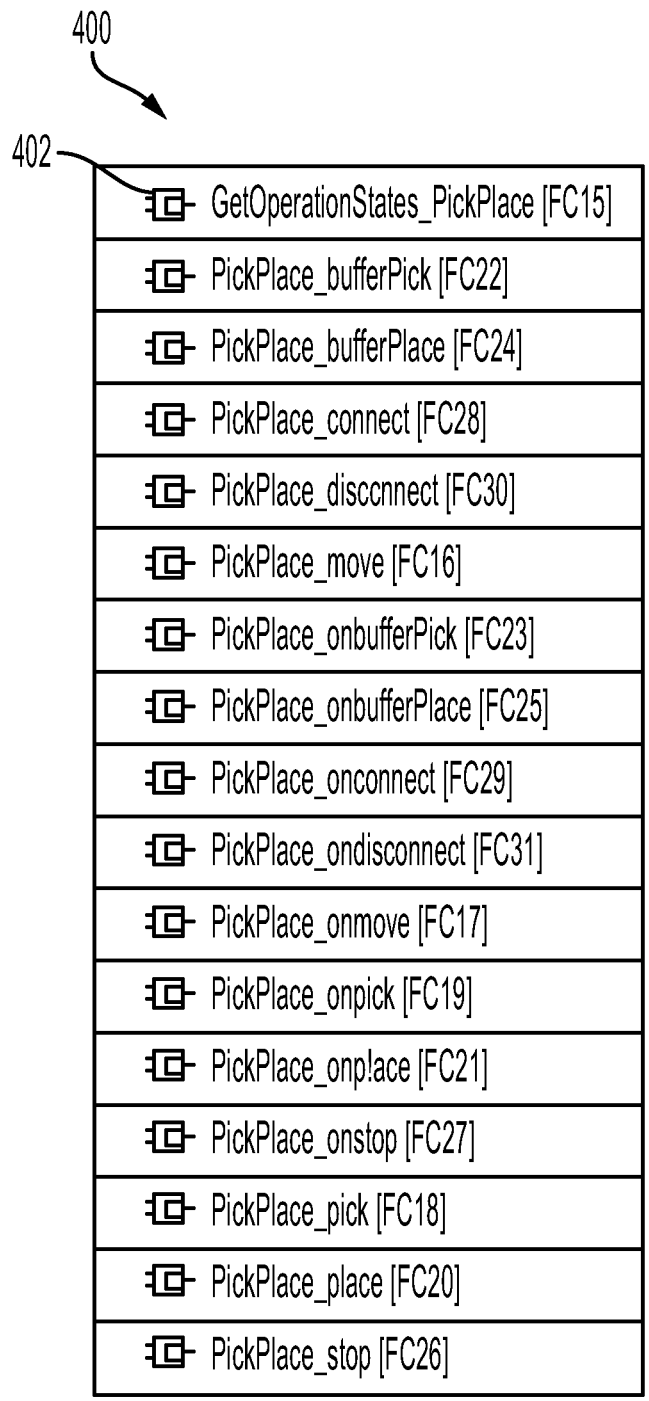
FIG. 4 depicts example FC blocks that can be associated with the PLC shown in FIG. 2, in accordance with an example embodiment.

Referring also to FIG. 4, example FC blocks 400 are shown. In an example, the skeleton portion of the connection on the PLC 202 can be implemented by SIMATIC FCs unmarshalling and marshaling the operation parameters associated with each operation from the provider memory area 114. The example FC blocks 400 can be generated for the PLC skeleton of the PickPlace interface. In particular, an FC 402 (GetOperationState_'InterfaceName') can be generated for each interface, so as to evaluate operation status flags. Further, the FC 402 can trigger the execution of an operation inside the PLC 202. Because, in various examples, the PLC user programs are executed cyclically, the FC 402 can repeatedly, for instance cyclically, check whether there is a new request.

Figure 5:
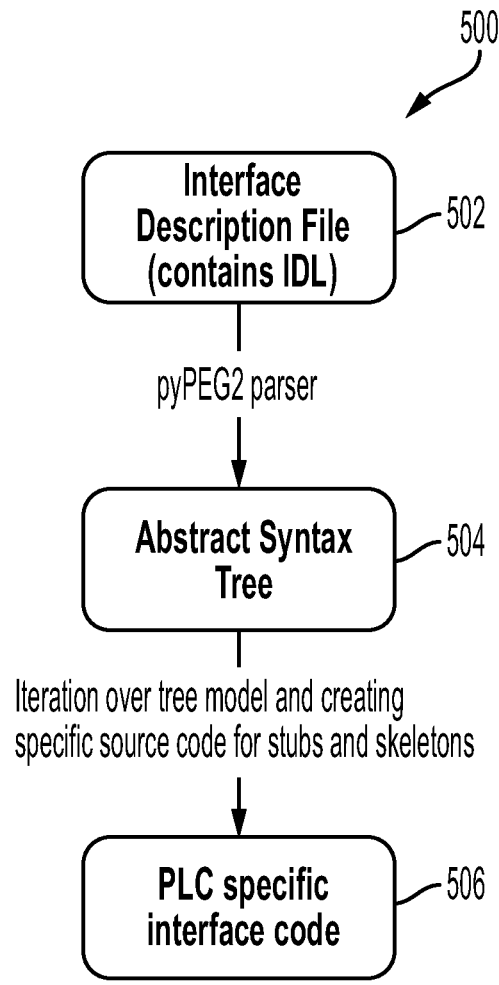
FIG. 5 illustrates example code that can be generated by a generator module for an interface associated with a given PLC, in accordance with an example embodiment.

Referring to FIG. 1 and FIG. 5, the generator module 114 can automatically generate stubs and skeletons, which can be collectively referred to as glue code or interfaces. In particular, in an example operation 500, the generator module 114 can generate stub code on the edge controller level and skeletons in the PLC user program. In an example, the generator module 114 can generate a new interface from an input 502, for instance an interface description file, which can define the abstract interface. From the input 502, the generator module 114 can generate PLC specific interface code 506 that can be imported to a PLC development environment. For example, the PLC specific interface code 506 can include SCL and PLCopenXML files. Referring in particular to FIG. 5, in an example, a python PEG Parser-Interpreter can be used to parse and store the interface model in an abstract syntax tree 504. After the PEG Parser-Interpreter is done, the interface can be stored in a python object tree, which can be traversed for generating the edge controller specific code and the PLC specific code 506. In an example, the format for the PLC code 506 include SIMATIC Structured Language (SCL) files that can be imported in the Siemens PLC development tool TIA-Portal. Beckhoff Automation can support the import of PLCopen XML files.

Figure 6:
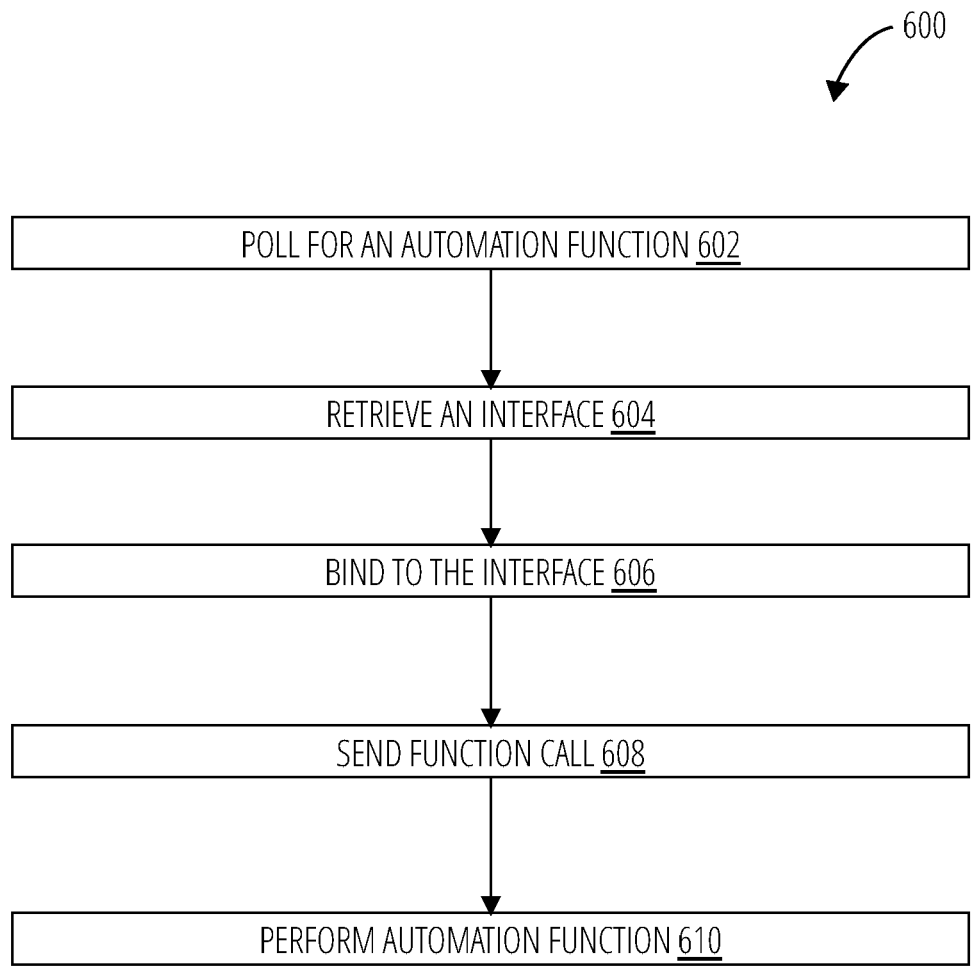
FIG. 6 is a flow diagram that depicts an example operation of an automation system that includes one or more programmable logic controller (PLCs) according to an example embodiment.

Referring now to FIG. 6, an example operation 600 may be performed within the systems 100 or 200, for instance by two or more PLCs. At 602, a consumer, for instance a PLC, can poll PLCs for an automation function. At 604, in response to the polling, a first PLC that includes a memory defining a plurality of dedicated memory areas, can retrieve an interface from a registry memory area that stores information concerning available interfaces in a provider memory area of the plurality of dedicated memory areas, such that the consumer discovers the interface. At 606, the consumer can bind to the interface so as to establish a connection between the consumer and the first PLC at runtime of the automation function. In some cases, the plurality of dedicated memory areas further defines a consumer memory area, the provider memory area, and the registry memory area. The first PLC can track available interfaces associated with the first PLC in the registry memory area of the plurality of dedicated memory areas. In various examples, the first PLC stores interfaces associated with the PLC operating as a provider in the provider memory area, and stores interfaces associated with the PLC operating as a consumer in the consumer memory area. After binding the consumer can send data to the first PLC via the interface, and the PLC can send data to the consumer via the interface.

Further, at 608, after binding, a function call can be sent to the first PLC to execute the automation function. In response to the function call, the stub of the consuming PLC can change an operation status flag within the provider memory area of the provider PLC so as to reserve the automation function for the consumer. In further response to the function call, the PLC can transfer operation parameters associated with the automation function to the consumer via the interface. After transferring the operation parameters, the PLC can change the operations status flag so as to indicate that the operation parameter transfer is complete. At 610, the PLC can call the automation function so as to execute the automation function by the PLC. After the automation function is executed, return parameters associated with the automation function can be transferred from the first PLC back to the consumer, via the interface. In some cases, a second PLC defines the consumer, such that PLCs can perform the role of a consumer or a provider, in accordance with various embodiments described herein.

Figure 7:
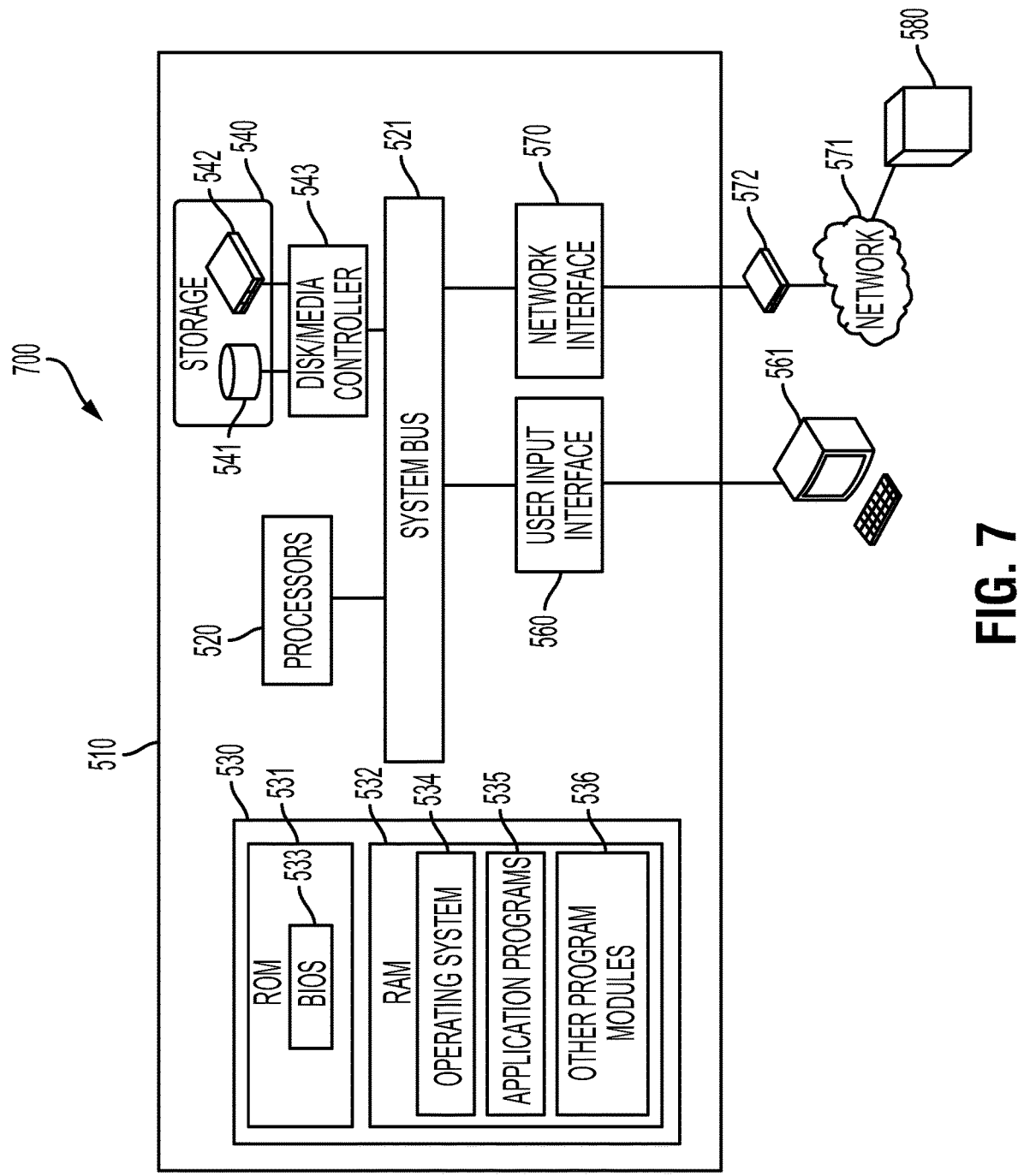
FIG. 7 shows an example of a computing environment within which embodiments of the disclosure may be implemented.

FIG. 7 illustrates an example of a computing environment within which embodiments of the present disclosure may be implemented. A computing environment 700 includes a computer system 510 that may include a communication mechanism such as a system bus 521 or other communication mechanism for communicating information within the computer system 510. The computer system 510 further includes one or more processors 520 coupled with the system bus 521 for processing the information. The PLCs described herein may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 7 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 7 and/or additional or alternate functionality. Further, functionality may be modularized differently such that processing described as being supported collectively by the collection of program modules depicted in the figures may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in the figures may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed in an automation system that comprises a plurality of ecosystems that define respective physical assets and a plurality of programmable logic controllers (PLCs) configured to control the physical assets, the method comprising:
   polling, by a consumer from one of the plurality of ecosystems, the plurality of PLCs for an automation function;
   in response to the polling, retrieving, by a first PLC of the plurality of PLCs that includes a memory defining a plurality of dedicated memory areas, an interface from a registry memory area that stores information concerning available interfaces in a provider memory area of the plurality of dedicated memory areas, such that the consumer discovers the interface;
   binding to the interface, by the consumer, so as to establish a connection between the consumer and the first PLC at runtime of the automation function; and
   after binding, sending a function call to the first PLC to execute the automation function.

2. The method as recited in claim 1, wherein the plurality of dedicated memory areas further defines a consumer memory area and the registry memory area, the method further comprising:
   tracking, by the first PLC, available interfaces associated with the first PLC in the registry memory area of the plurality of dedicated memory areas.

3. The method as recited in claim 2, the method further comprising:
   storing interfaces associated with the PLC operating as a provider in the provider memory area; and
   storing interfaces associated with the PLC operating as a consumer in the consumer memory area.

4. The method as recited in claim 1, the method further comprising:
   after binding, the consumer sending data to the first PLC via the interface.

5. The method as recited in claim 1, the method further comprising:
   after binding, the consumer receiving data from the first PLC via the interface.

6. The method as recited in claim 1, the method further comprising:
in response to the function call, the first PLC changing an operation status flag within the provider memory area so at reserve the automation function for the consumer.

7. The method as recited in claim 6, the method further comprising,
in further response to the function call, transferring operation parameters associated with the automation function to the consumer via the interface.

8. The method as recited in claim 6, the method further comprising:
after transferring the operation parameters, changing the operations status flag so as to indicate that the operation parameter transfer is complete; and
calling the automation function so as to execute the automation function by the first PLC.

9. The method as recited in claim 8, the method further comprising:
after the automation function is executed, transferring return parameters associated with the automation function from the consumer to the first PLC, via the interface.

10. The method as recited in claim 1, wherein the plurality of PLCs include a second PLC that defines the consumer.

11. A programmable logic controller (PLC), the PLC comprising:
a processor; and
a memory defining a plurality of dedicated memory areas, the memory storing instructions that, when executed by the processor, configure the PLC to:
in response to a poll from a consumer, retrieve an interface from a registry memory area that stores information concerning available interfaces in a provider memory area of the plurality of dedicated memory areas, such that the consumer discovers the interface;
establish a connection, using the interface, between the consumer and the PLC at runtime of the automation function, so as to define a binding of the consumer to the interface; and
after the binding, receive a function call, from the consumer, to execute the automation function.

12. The PLC of claim 11, wherein the plurality of dedicated memory areas further defines a consumer memory area and the registry memory area, the memory further storing instructions that, when executed by the processor, further configure the PLC to:
track available interfaces associated with the PLC in the registry memory area of the plurality of dedicated memory areas.

13. The PLC of claim 12, the memory further storing instructions that, when executed by the processor, further configure the PLC to:
store interfaces associated with the PLC operating as a provider in the provider memory area; and
store interfaces associated with the PLC operating as a consumer in the consumer memory area.

14. The PLC of claim 11, the memory further storing instructions that, when executed by the processor, further configure the PLC to:
after binding, receive data from the consumer via the interface; and
after binding, send data to the consumer via the interface.

15. The PLC of claim 11, the memory further storing instructions that, when executed by the processor, further configure the PLC to:
in response to the function call, change an operation status flag within the provider memory area so at reserve the automation function for the consumer.

* * * * *